United States Patent [19]

Muto et al.

[11] Patent Number: 4,576,039
[45] Date of Patent: Mar. 18, 1986

[54] AIR-FLOW DETECTING APPARATUS

[75] Inventors: Yukio Muto, Oobu; Masumi Kinugawa, Okazaki; Tomoaki Abe, Oobu, all of Japan

[73] Assignee: Nippondenso Co., Ltd., Kariya, Japan

[21] Appl. No.: 591,378

[22] Filed: Mar. 20, 1984

[30] Foreign Application Priority Data

Mar. 24, 1983 [JP] Japan .................................. 58-49423

[51] Int. Cl.$^4$ ........................................... G01M 15/00
[52] U.S. Cl. ....................................... 73/118; 73/204; 123/494
[58] Field of Search ................... 73/118, 204; 123/417, 123/494

[56] References Cited

U.S. PATENT DOCUMENTS 4,357,830 11/1982 Kohama et al. ...................... 73/204
4,400,974 8/1983 Nishimura et al. ................... 73/118

FOREIGN PATENT DOCUMENTS 56-18721 2/1981 Japan .

Primary Examiner—Jerry W. Myracle
Attorney, Agent, or Firm—Cushman, Darby & Cushman

[57] ABSTRACT

This apparatus measures and detects the air-flow taken into an intake pipe of an internal combustion engine, and includes an air-flow detecting sensor. The air-flow detecting sensor comprises a support frame made of heat-resistant insulation material, a heating line supported by the support frame on the upper side when viewed from the direction in which the air-flows, a heat-controlled heating current, and a resistance line also supported by the support frame on the lower side when viewed from the direction in which the air-flows which has a temperature characteristic. Air-flow detecting signals which represent the condition under which heat is transmitted to the resistance line through the air-flow are picked up from the sensor for every specified timing to set and calculate the transmitting coefficients of heat transmitted from the heating line to the resistance line, which is specified by the sensor and which is set corresponding to the amount of the signal detected by the sensor. The signal detected by the sensor is inversely transformed using the transmitting coefficients, and this transformed signal is supplied to the electronic control circuit of the internal combustion engine as part of the signal used for detecting the conditions under which the engine should be operated.

9 Claims, 10 Drawing Figures

AIR-FLOW DETECTING APPARATUS

BACKGROUND OF THE INVENTION

The present invention relates to an air-flow detecting apparatus for measuring and detecting the amount of intake air of a car.

To determine the amount of fuel to be injected in an internal combustion engine of a car, for example, it is necessary to measure and detect engine rotational speed, temperature of the gas exhausted, temperature of the cooling water, the amount of air taken in, and the like. Signals from sensors which measure these factors are used as operational control data to determine the amount of fuel to be injected. As a typical air-flow detecting sensor, the well-known hot-wire type sensor is disclosed in the U.S. Pat. No. 4,357,830, Japanese Patent Disclosure No. 56/18721, and so on.

FIG. 1 shows an example of an arrangement relating to an air-flow detecting sensor 10 of the hot-wire type, which includes a support frame 11 which is provided with a pair of legs 111 and 112, a heating line 12 wound around the legs 111 and 112 of the frame 11, and a resistance line 13 also wound around the legs 111 and 112 and separated from the heating line 12. The resistance value of the resistance line 13 changes with changes in its temperature. The sensor 10 thus constructed is arranged in the air intake pipe for the car's engine, for example, with the heating line 12 located on the upper side when viewed from the direction G in which the air flows.

Heat emitted from the heating line 12 is transmitted to the resistance line 13 and is detected as a change in the resistance value of the resistance line 13. The path in which the heat is transmitted to the resistance line 13 follows air-flow G. The amount of this air-flow G is therefore measured and calculated from a value which represents the amount of heat transmitted.

With an air-flow detecting sensor 10 like this, however, heat is transmitted from the heating line 12 to the resistance line 13 not only through the air-flow G but also through the legs 111 and 112 of the support frame 11. Therefore, a signal which represents the sum of the amount of heat transmitted both through the air-flow G and through the legs 111 and 112 is supplied from the sensor 10 as a detection signal for the air-flow G.

Assuming that the air-flow G increases as shown by the broken line in FIG. 2, the detection signal from the sensor 10 also changes in correspondence with this air-flow. However, the necessary change in the detection signal follows the change in the amount of the air-flow as shown by the solid line in FIG. 2.

The delayed response at step 1, which is denoted by A, is caused mainly by the heat capacities of the heating and resistance lines 12 and 13 and is relatively small. However, the delayed response at step 2, which is represented by B and which is caused by the heat capacity of the legs 111 and 112 of the support frame 11, will be a long one. This delay B ranges from several seconds to several tens of seconds. The error because of this delay sometimes amounts to 10%.

The length of the delay controls the amount of air intake for the engine. That is, when the detection signal from the sensor 10 is supplied, as it is, to the electronic engine control means to control the amount of fuel injected and the ignition timing, the emission level is remarkably reduced and the overall performance of the engine is improved.

SUMMARY OF THE INVENTION

An object of the present invention is to provide an air-flow detecting apparatus wherein a delayed response is related to changes in the air-flow when heat emitted from the heating line is transmitted to the resistance line, and wherein the delay can be compensated to enable the detection output signal to reliably follow changes in the air-flow.

Another object of the present invention is to establish a transmission coefficient on the basis of the detection signal applied from a sensor so as to obtain a signal which better represents air-flow.

A further object of the present invention is to provide a detection signal which is more responsive to the engine so as to enable the amount of fuel injected to be controlled and the timing of the ignition to be synchronously maintained even under transient conditions, when it is embodied as an apparatus for detecting the amount of air intake in an engine.

With an air-flow detecting apparatus according to the present invention, a coefficient which corresponds to the response characteristic of an air-flow sensor is set and stored. The detection output signal from the sensor is inversely transformed, on the basis of the stored transmitting coefficient, to generate a corrected detection signal. This corrected detection signal is used as an intake air detecting signal in the control circuit of an engine, for example.

When this air-flow detecting apparatus is used to detect the amount of air taken into an engine, the output signal from the sensor can be corrected to thereby achieve an extremely refined control of the ratio of air to fuel. Further, transmitting factors employed when setting the transmitting coefficient are assumed to absorb the response delay of the sensor itself and also to even absorb, to some extent, the response delays caused by the combustion of the engine, for example. When the transmitting coefficient is set and stored in the memory of an engine control unit which is backed up by a battery, compensation can be attained even for changes caused by the lapse of time or by cylinder dust.

DETAILED DESCRIPTION OF THE PREFERRED EMBODIMENT

Figure 1:
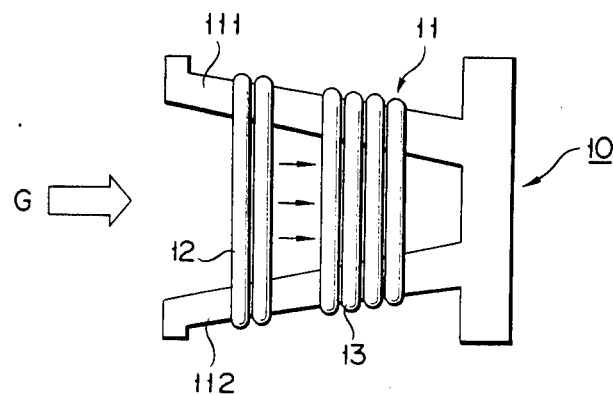
FIG. 1 shows the basic arrangement of the air-flow detecting sensor of the hot-wire type usually employed.
Figure 3:
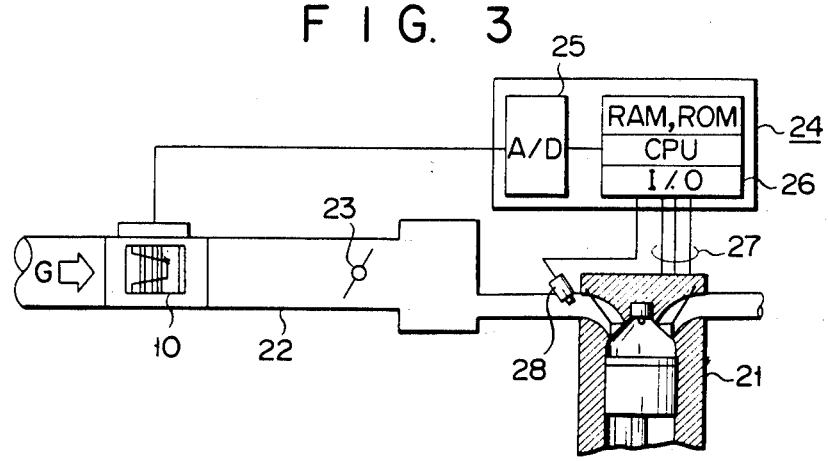
FIG. 3 is a view showing an engine control system in which an example of an air-flow detecting apparatus according to the present invention is employed.

FIG. 3 shows an example of an air-flow detecting apparatus according to the present invention which is used as a means for detecting the amount of air taken into a car's engine. An air-flow sensor 10 shown in FIG. 1 is located in an intake pipe 22 of the engine. The sensor 10 is controlled by the air-flow G shown in FIG. 1. The air-flow passing through the sensor 10 is guided into engine cylinders 21 through a throttle valve 23.

A detection signal for measuring the amount of air taken into the engine is supplied from the sensor 10 to an electronic engine control unit 24, is converted to digital data by means of an A/D converter 25 in the unit 24, and is then picked up by a control operational section 26 which consists of a one chip micro-computer.

Though not shown in detail, the control operation section 26 receives at its input/output ports (I/O) via a wire harness 27 detection signals from sensor 10 and from sensors responsive to the temperature of the cooling water of the engine, the rotation speed of the engine, the degree the throttle valve 23 is open, and the like. A predetermined operational process is carried out by the CPU to control the time during which a fuel injection valve 28 is opened, and to set the amount of fuel injected. The fuel injection can thus be controlled according to the operation of the engine. In addition, control of ignition timing and of the other factors listed above can also be achieved.

Figure 4:
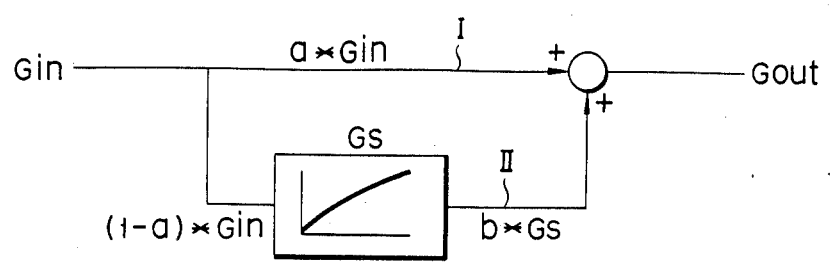
FIG. 4 is an equivalent diagram for explaining the response of an air-flow detecting sensor employed in the engine control system.

When the air-flow sensor 10 of a hot-wire type supplies control instructing detection signals to the control unit 24 in order to control the amount of the fuel injected and ignition timing in the engine, the air-flow (Gin) moves at a rate (a) which corresponds to the output, as shown in FIG. 4. A line (I) which directly corresponds to a response (A) is shown in FIG. 2.

Figure 2:
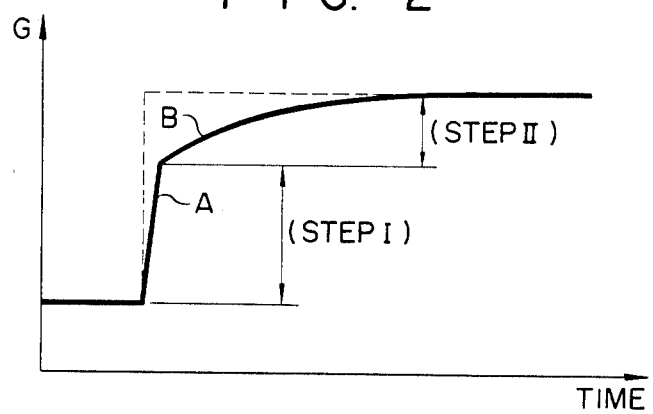
FIG. 2 is a graph intended to explain the response of the sensor.

The remaining part of the air-flow [(1−a)Gin] corresponds to a response (B) in FIG. 2, which is deemed as a first-order lag caused by heat. The response (B) is also therefore deemed as input to the heat transmitted line which is represented by a line (II). A reduced amount (Gs) will be now taken into consideration for the purpose of making it easier to calculate the first-order lag line.

If the reduced amount (Gs) is increased by the amount of input air [(1−a)Gin] to the line (II), it is forced to have the condition specified by the sensor 10. Also, its pattern of change is set and stored in the memory. A factor (b) is set in relation to any changes in the amount of input air, and the reduced amount (Gs) is reduced at the rate of (b), based on the air-flow (Gin). The first-order lag line is formed by this reduced amount (Gs). The reduced part (bGs) of the air-flow is added to part (aGin) of the input air-flow (Gin) which is directly related to the output, and which becomes the output (Gout) of the sensor 10.

As is apparent from the above, the transmitting coefficient of the air-flow detecting sensor 10 of a hot-wire type is expressed by the following two equations:

$$Gout = a \cdot Gin + b \cdot Gs \quad (1)$$

$$\frac{d}{dt} Gs = (1 - a)Gin - b \cdot Gs \quad (2)$$

When the input (Gin) is obtained from the output (Gout) in equations (1) and (2), the true amount of input air which has delayed response can be found. This solves any problems caused by a delayed response in the sensor 10.

Figure 5:
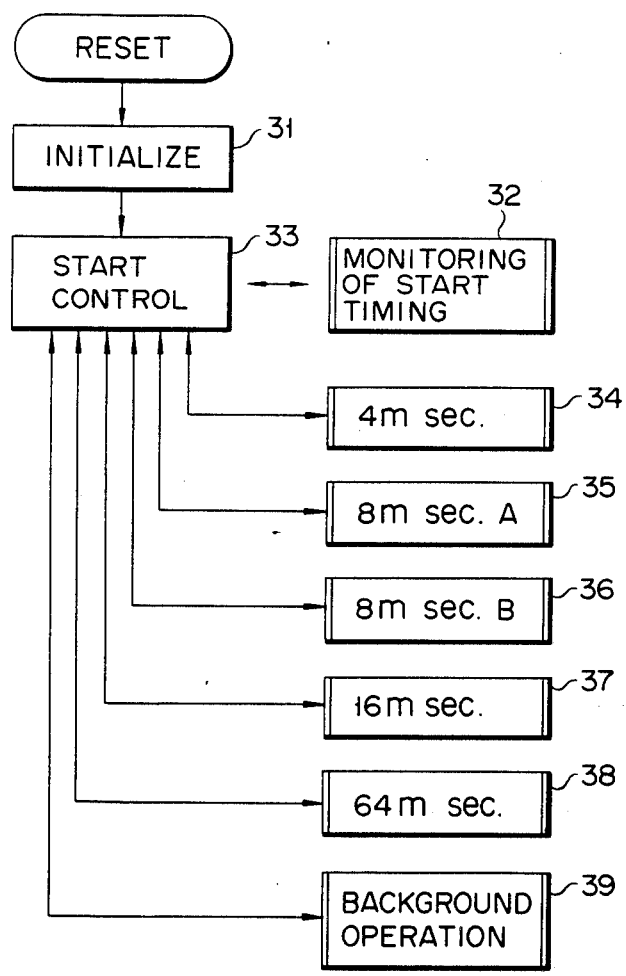
FIG. 5 is a flow chart for roughly explaining the operation of the engine control system.

FIG. 5 shows roughly the flow of the control program for the control system of the engine which is shown in FIG. 3. The CPU becomes operative upon responding to the reset signal. The CPU then performs an initializing process 31, and monitors the counts, which are synchronous with a system clock (not shown) through a start timing monitoring module 32. The CPU asks a task start control module 33 to generate a start demand for every predetermined time period. The start control module 33 judges the kind of start demand received before starting and controlling the appropriate tasks 34–39. The tasks 34–39 are in groups of six and depend upon the starting frequencies of 4 msec, 8 msec (A), 8 msec (B), 16 msec and 64 msec, in addition to a background operation. Tasks 34–38 also use the same time periods as mentioned above, while the task 39 is started using the dead-time period.

The starting must be precise to achieve A/D conversion, linearization and response compensation related to the detection signals which represent the amount of air taken in. First priority is therefore given to the timing of the task 36 which is started every 8 msec. A corrected signal obtained here represents the amount of air used to calculate the amount of fuel injected.

Figure 6:
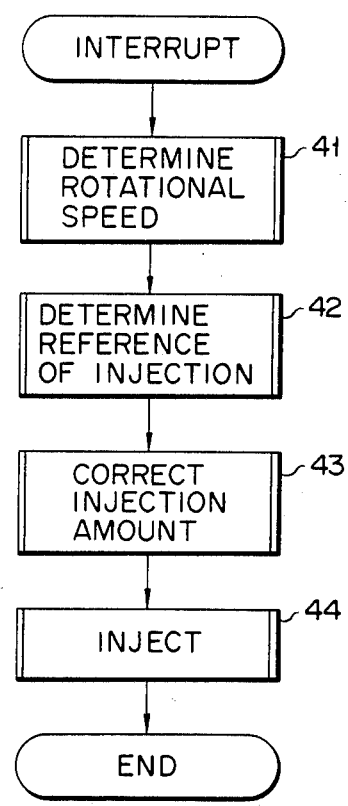
FIG. 6 is a flow chart for explaining how fuel injection is controlled in the engine control system.

FIG. 6 shows an interrupted flow of 180° C.A which corresponds to the rotational angle of the engine and which represents the process for controlling the amount of fuel injected into the engine. The basic amount of injected fuel (Tp) is obtained through a module 42 to calculate the basic amount of fuel injected. The calculation uses the rotation speed (N) obtained through the rotation speed calculating module 41, the corrected air-flow (Gin) calculated by the task 36, and a constant (K).

$$Tp = K \times Gin/N$$

The basic amount of injected fuel (Tp) is corrected through a correction processing module 43. The injection processing module 44 is driven by the final pulse width signal, which represents the result of the correction, to control the time period in which the fuel injection valve 28 is opened and closed, and which is responsive to the pulse width of said signal thereby enabling the amount of fuel injected to be set and controlled.

The amount of air detected which corresponds to the start of the task 36 is corrected, thus carrying out the following process. Equation (1) is transformed to:

$$Gin = \frac{1}{a}(Gout - b \cdot Gs) \quad (3)$$

Input (Gin) can be obtained from output (Gout), following equations (2) and (3), but equation (2) is replaced as follows to periodically perform the correction calculation when control is attained by a digital computer:

$$\frac{d}{dt} Gs^i \rightarrow Gs - G$$

wherein a subindex (i) represents the order of operation. Considering the order of operation in the digital computer, equations (2) and (3) are further transformed to:

$$\overset{i}{G\text{in}} = \frac{1}{a}(\overset{i}{G\text{out}} - b \cdot \overset{i-1}{Gs}) \qquad (4)$$

$$\overset{i}{Gs} = (1-a)\overset{i}{G\text{in}} + (1-b)\overset{i-1}{Gs} \qquad (5)$$

Therefore, (G), which is obtained by calculating these two equations (4) and (5), is the signal which represents the corrected amount of air.

Figure 7:
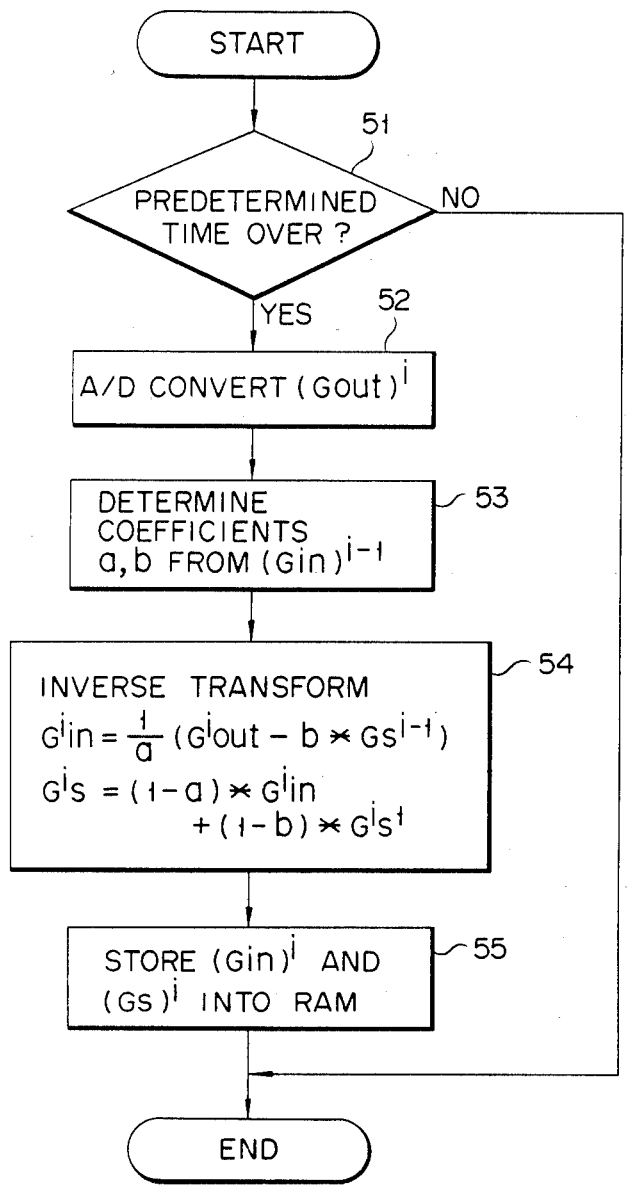
FIG. 7 is a flow chart for explaining how the correction of the detection signal is applied from the air-flow detecting sensor.

FIG. 7 shows the flow of the correction process to obtain the air-flow signal. The start of the correction process conducted by task 36 every 8 msec is recognized at step 51. The signal output directly from the air-flow detecting sensor 10 is subjected to A/D conversion at step 52. The linearizing process is also carried out in this case, if necessary to obtain the output (Gout)$^i$.

Coefficients (a) and (b) are then determined at step 53 to obtain (Gin)$^i$. These coefficients (a) and (b) are factors of (Gin)$^i$. As (Gin)$^i$ is not calculated yet, the factors are therefore determined by using its preceding (Gin)$^{i-1}$. Since the coefficients (a) and (b) are not so large when compared with (Gin), errors caused in relation to the coefficients (a) and (b) are negligible, even when the preceding (Gin)$^{i-1}$ is used instead of (Gin)$^i$.

Inverse transformation is carried out at step 54 by the operation which corresponds to equations (4) and (5). The reason why (Gs)$^{i-1}$ is used instead of (Gs)$^i$ for the calculation of (Gin) is that (Gs)$^i$ is not calculated yet. Since (Gs) is not so different from (Gs$^{i-1}$), the errors are negligible even when (Gs)$^{i-1}$ is used instead of (Gs). (Gs) is renewed using (Gin)$^i$ and (Gs)$^{i-1}$ thus calculated, and (Gin)$^i$ and (Gs)$^i$ are stored in the RAM and the like at step 55.

Although the present invention has been described citing the micro-computer in the electronic control system of an engine, a similar correction of detection signals can be achieved even when the air-flow correcting process represented by equations (2) and (3) is realized using an analog circuit instead of the above-described digital process.

Figure 8A:
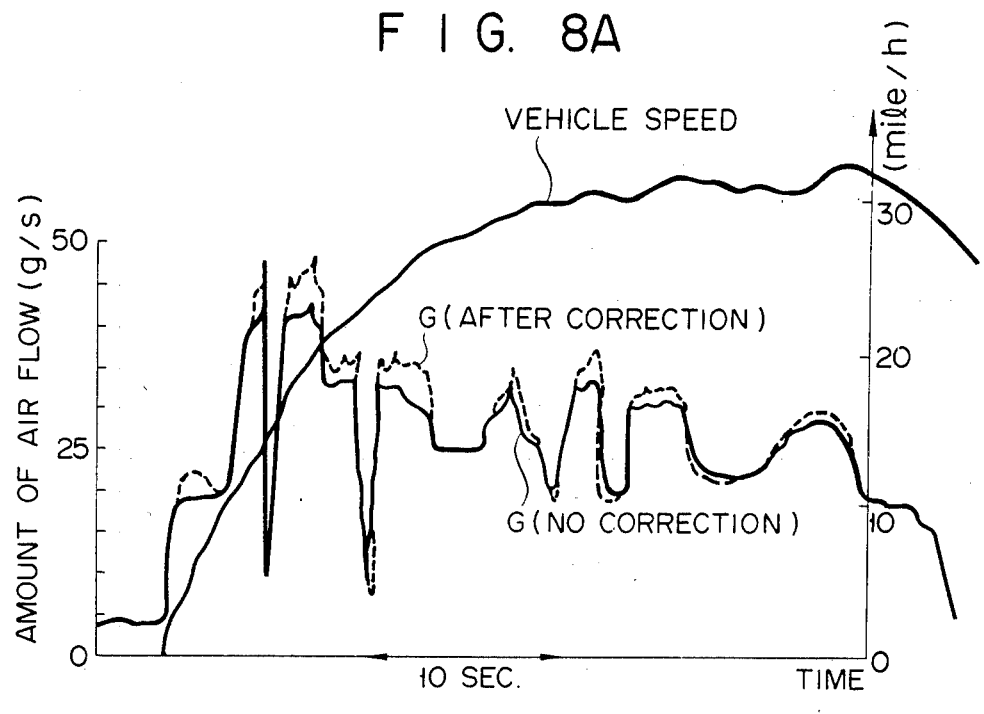
FIG. 8A has characteristic curves showing when, in response to the speed of the car, an output signal should be corrected and when it should not be changed.
Figure 8B:
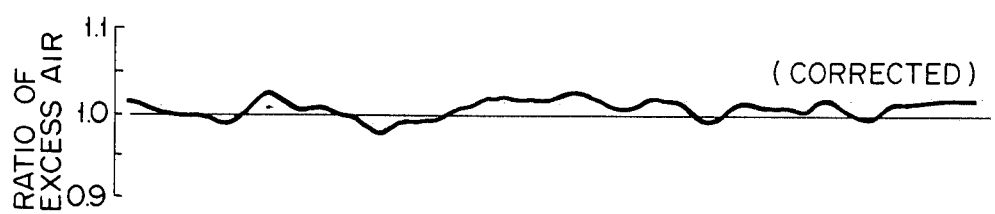
FIGS. 8B and 8C are characteristic curves showing the ratios of excess air both in the case where the signal applied from the sensor is corrected and in the case where it is not corrected.
Figure 8C:
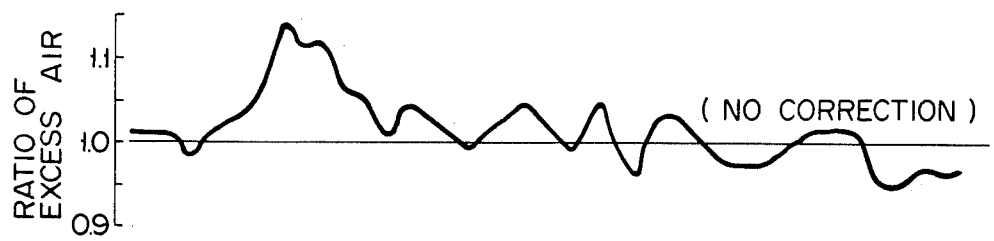

FIGS. 8A through 8C show an air-flow signal (G) and the ratio of excessive air (λ) to usable air during driving. FIG. 8A shows the comparison between a case where the amount of air (G) is corrected in relation to the car's speed and a case where it is not corrected. FIGS. 8B and 8C show the ratios of excessive air (λ) to usable air without correction and after correction, respectively. When no correction is made, the fuel mixture becomes very lean, caused by rapid acceleration, and the ratio of excessive to usable air changes in response to even trivial changes in the amount of air. When a corrected air-flow signal (G) is used, however, the ratio of excessive air (λ) to usable air changes by only a few percentage points even when changes in the amount of air are large and rapid.

With the above-described apparatus for detecting the air-flow, the uncorrected detection signal may be picked up as an output signal and so remain unchanged under any driving conditions, or when the presumption of the transmitting coefficients is so difficult as to cause erroneous correction.

What is claimed is:

1. An air-flow detecting apparatus comprising:
   (a) an air-flow detecting sensor including a support frame made of heat-resistant insulating material, a heating line supported by the support frame, and a resistance line also supported by the support frame and located on the lower side, in relation to the heating line when viewed from the direction in which air flows, said resistance line having a temperature resistance characteristic which allows it to serve as a thermometer;
   (b) means for measuring and detecting an output signal of the sensor at predetermined intervals, said output signal being changed corresponding to changes in the air-flow;
   (c) means for setting transmitting coefficients, corresponding to a transmitting characteristic of the sensor, based on the time delay for the amount of actual input air to appear as an output of the sensor in relation to the coefficients for a delay line; and
   (d) means for obtaining an air-flow measuring output signal in such a way that a detection signal supplied from the sensor is subjected to inverse transformation using the transmitting coefficients set by setting means in response to the previously determined air-flow measuring output signal.

2. An air-flow detecting apparatus according to claim 1, wherein the transmitting coefficients are denoted by an equation in which the sum of: (a) the heat which is transmitted from the heating line directly to the resistance line through air-flow to quickly act on the output of the sensor, and (b) the heat which is transmitted from the heating line to the resistance line through the support frame to act on the output of the sensor after a first-order lag, is used as a sensor-detected-output.

3. An air-flow detecting apparatus according to claim 1, wherein the air-flow detecting sensor is fixed in an intake pipe of the internal combustion engine to measure the amount of intake air, and output signals of the sensor are used to detect the operation of the engine for the purpose of electronically controlling the engine.

4. An air-flow detecting apparatus according to claim 3, wherein a control means for the internal combustion engine controls the amount of fuel injected, according to the operation of the engine.

5. An air-flow detecting apparatus comprising:
   (a) an air-flow detecting sensor including a support frame made of heat-resistant insulating material, a heating line supported by the support frame and located on the lower side, in relation to the heating line when viewed from the direction in which air flows, said resistance line having a temperature resistance characteristic which allows it to serve as a thermometer;
   (b) means for detecting and digitizing output signals of the air-flow detecting sensor at predetermined intervals;
   (c) means for setting coefficients which are set as factors on the basis of the output signals detected from the sensor at said intervals, said factors representing changes in the amount of input air;
   (d) means for setting a reduced amount which is increased responsive to detection of an increased amount of input air, and which is reduced corresponding to a heat transmitting characteristic of heat emitted from the heating line being transmitted to the resistance line corresponding to the amount of air-flow;
   (e) means for setting transmitting coefficients, using the factors and the reduced amount which are set at a preceding one of said intervals and which correspond to the amount of input air; and (f) means for generating corrected signals which represent the amount of air-flow by inversely transforming signals detected from the sensor at said intervals using the transmitting coefficients set at said intervals.

6. An air-flow detecting apparatus according to claim 5, wherein the reduced amount is set by the reduced amount setting means in such a way that it corresponds to a heat transmitting characteristic in which heat emitted from the heating line is transmitted to the resistance line through the support frame, which supports both of the heating and resistance lines, and that it increases corresponding to the amount of input air-flow.

7. An air-flow detecting apparatus according to claim 6, wherein change patterns of the reduced amount which correspond to the air-flow are stored in a memory corresponding to the air-flow detecting sensor and read out corresponding to the output of the sensor.

8. An air-flow detecting apparatus for an engine comprising:

means, provided in an intake passage of said engine, for heating air flowing therethrough;

means, provided downstream from said heater means in said intake passage, for detecting the temperature of air heated by said heating means and generating a detection output varying in accordance with the detected air temperature;

means for providing a predetermined function indicative of a transmitting characteristic between an amount of air-flow and the detection output of said detecting means, said predetermined function having a first term proportional to the detection output of said detecting means and a second term which is a delay function of the first order; and means for calculating the amount of air-flow from the detection output of said detecting means based on said predetermined function.

9. An air-flow detecting apparatus according to claim 8, wherein said second term of said predetermined function is varied in accordance with the amount of air-flow calculated currently to be used in the next calculation of the amount of air-flow by said calculating means.

* * * * *